United States Patent [19]

Gould

[11] Patent Number: 5,293,377
[45] Date of Patent: Mar. 8, 1994

[54] NETWORK CONTROL INFORMATION WITHOUT RESERVED BANDWIDTH

[75] Inventor: Joel M. Gould, Norwood, Mass.

[73] Assignee: International Business Machines, Corporation, Armonk, N.Y.

[21] Appl. No.: 593,824

[22] Filed: Oct. 5, 1990

[51] Int. Cl.$^5$ .............................................. H04J 3/24
[52] U.S. Cl. .................................. 370/94.1; 370/111
[58] Field of Search ................ 370/94.1, 94.2, 110.1, 370/84, 85.1, 24, 29, 31, 111, 60; 375/112

[56] References Cited

U.S. PATENT DOCUMENTS

| | | | |
|---|---|---|---|
| 3,445,822 | 5/1969 | Driscoll, Jr. | 364/200 |
| 3,566,363 | 2/1971 | Driscoll, Jr. | 364/200 |
| 3,593,300 | 7/1971 | Driscoll, Jr. | 364/200 |
| 4,099,233 | 7/1978 | Barbagelata et al. | 364/200 |
| 4,228,496 | 10/1980 | Katzman et al. | 364/200 |
| 4,330,858 | 5/1982 | Choquet | 370/111 |
| 4,346,440 | 8/1982 | Kyu et al. | 370/85.15 |
| 4,689,790 | 8/1987 | Lacroix et al. | 370/111 |
| 4,701,907 | 10/1987 | Collins | 370/63 |
| 4,730,308 | 3/1988 | Friedman et al. | 370/94.1 |
| 4,797,589 | 1/1989 | Collins | 370/63 |
| 4,897,831 | 1/1990 | Negi et al. | 370/31 |
| 5,008,901 | 4/1991 | Wallach et al. | 370/30 |
| 5,042,062 | 8/1991 | Lee et al. | 370/58.2 |

*Primary Examiner*—Douglas W. Olms
*Assistant Examiner*—Shick Hom
*Attorney, Agent, or Firm*—Perman & Green

[57] ABSTRACT

Apparatus and method for transmitting control information in a multidimensional computer network are disclosed herein. A multidimensional computer network consists of a number of homogeneous or heterogeneous processing sites, called nodes. All that is required of a node is that it be able to receive data blocks from other nodes and send data blocks to other nodes. Interconnecting the nodes are links which connect the nodes in a regular or irregular pattern. The invention applies to multidimensional, or parallel, networks as well as to single dimensional networks where only one path exists between any two nodes. The invention improves upon the prior art by stealing bandwidth from the data transmission facilities on demand without requiring prior reservation of a fixed amount of bandwidth. The bandwidth is used to transmit control information in small data transmissions.

30 Claims, 3 Drawing Sheets

NETWORK CONTROL INFORMATION WITHOUT RESERVED BANDWIDTH

FIELD OF THE INVENTION

This invention generally relates to improvements in a nodal communication system and more particularly to a technique that enhances management of a multidimensional computer network.

BACKGROUND OF THE INVENTION

Since the advent of the electronic computer in reliable form, workers in the art have given much consideration to systems employing a number of computers functioning together in interrelated fashion to accomplish a given overall task. In some of these multiprocessor systems a large computer utilizes its superior speed and capacity to perform the complex portions of a program, but assigns smaller and slower satellite processors the less complicated and less urgent tasks in order to reduce the load and demands upon the large computer. The large computer is required to undertake the responsibilities of assigning subtasks, making sure that the smaller processors are kept occupied, ascertaining the availability and performance of the smaller processors, and providing a unified result.

Other multiprocessor systems utilize a different approach, employing a plurality of processors and a common bus system, with the processors having essential equality of function. In this type of system, separate control computers or control systems are often used to monitor the availability and capability of an individual processor for a given subtask, and to control the routing of tasks and information between processors. The processors may be arranged and operated so that they monitor the status and availability of the other processors and determine the routing of messages and programs. The common and substantial drawback of these systems is that the software and operating time required for overhead and maintenance functions interfere with the performance of the principal objectives. Problems of routing and monitoring may increase dramatically in relation to the number of processors involved, so that ultimately a disproportionate amount of effort is spent in overhead functions.

Since the days of the early "Binac" (two parallel processors) and comparable systems it has been recognized that a multiprocessor provides a redundant capability that can substantially improve the overall reliability of an operating system. Actual installations of multiprocessor systems have until recently been quite limited, largely due to the extensive software problems involved. Nevertheless, the advantages of multiprocessor operation for real time applications and other situations in which system down time cannot be tolerated have led to the development of systems which are successful in operation but which nevertheless involve significant commitments to overhead software and operating time.

Illustrative of multitasking systems are U.S. Pat. Nos. 3,445,822, 3,566,363 and 3,593,300, all relating to a system in which multiple computers access a single shared main memory, and in which capabilities and requirements are compared in order to assign tasks optimally to individual processors.

Another example of the prior art is U.S. Pat. No. 4,099,233, in which a number of processors share a single bus and a control unit incorporating a buffer register is used in the transfer of data blocks between a transmitting miniprocessor and a receiving miniprocessor. This concept has been employed in a distributed mail sorting system in Europe.

U.S. Pat. No. 4,228,496 pertains to a multiprocessor system in which buses between processors are coupled to bus controllers which monitor transmissions and determine the priority of data transfers between processors, each of which can be coupled in to control a certain part of a number of peripheral devices.

The "Ethernet" system, described in U.S. Pat. No. 4,063,220 and U.S. Pat. No. 4,099,024 discloses another approach to the problem of intercommunicating between different processors and peripherals. All units are coupled to a common multiple access network and compete for priority. Collision detection is based upon time priority, which in turn means that global capabilities cannot readily be controlled, coordinated or given specificity.

Details of these complex systems can only be fully appreciated by analysis of the patents and any related publications. However, review will verify that in each instance prioritizing of data transfer and the selection of processors requires extensive intercommunication and supervisory control if tasks are to be shared. Expansion of the systems to include additional processors does not present identical problems with these different systems, but in each instance substantially complicates system software, applications programming, hardware, or all three.

In most networks, each message is positively acknowledged when it reaches the destination node by sending an acknowledgement word back along the path used to transmit the message (this technique applies to both circuit switched and packet switched networks). Thus, a source node enqueues its message into the network and starts a countdown timer. If the positive acknowledgement is received before the timer expires, the message transmission is considered successful. If the timer expires before an acknowledgement is received, the message transmission is considered a failure and the message must be resent.

The problem with the above scheme is that the source node only knows if the message succeeds or fails, no maximum progress report is given. Message failure might have been caused by several reasons including network congestion, broken links, transmission errors, and node errors. Since the source node does not know the cause of the failure or the maximum message progress, its only option is to retry sending the message or abort the message.

An obvious improvement to the above scheme is to add negative acknowledgements that indicate why the message failed. Thus, some single-dimensional (one path) networks return specific status words when the message transfer has failed. However, this method does not scale to multidimensional networks where multiple paths can fail. In the above example, suppose Node 1's children, Nodes 2 and 4, both fail sending the message for different reasons. They both return this information to Node 1. Node 1 must then return both errors to Node 0, requiring Node 0 to process every error that occurs on every search path. While this protocol satisfies the expendability need, it requires too much overhead memory by not encapsulating status information into a single status word. Furthermore, too much network bandwidth is required to support this method.

A final refinement to the scheme would allow intermediate nodes to accumulate error reports and pass only the most severe error report to its parent. Although this scheme reduces the acknowledgement message traffic, it does not encapsulate the message progress through the network. Using this scheme, the source node is only informed of the most severe error occurring on any search branch without any information regarding message progress being reported.

Inherent constraints on multiprocessor system size and capability are imposed by the use of one or two logically passive busses. While different techniques can be employed to facilitate intercommunication, such as the grouping of subsystems into global resources evidenced in U.S. Pat. No. 4,240,143, the amount of useful traffic must reach a limit and variable delays impose insuperable problems when large numbers of processors are used. Situations may arise in which one or more processors become locked out or deadlocked, and these circumstances in turn require added circuitry and software to resolve the problems. The impracticality of substantially extending the number of processors, say to 1024, thus becomes evident.

It is desirable for many applications to depart from the constraints of these existing approaches and to utilize modern technology to best advantage. The lowest cost technology available today is based upon mass produced microprocessors, and high capacity rotating disk memories, such as Winchester technology devices using small head to disk spacing in a sealed environment.

It is desirable to expand a multiprocessor system without disproportionate or even concomitant software complexity. It is desirable further to be able to handle computer problems that may be characterized as having a distributed structure, in which an overall function can be dynamically subdivided into limited or iterative processing tasks.

Virtually all data base machines fall into this category, which also includes such other typical examples as sorting, pattern recognition and correlation, digital filtering, large matrix computations, simulation of physical systems and the like. In all of these situations there is a requirement for widely dispersed, relatively straight-forward individual processing tasks with a high instantaneous task load. This situation unduly burdens prior art multiprocessor systems because it tends to increase the time and software involved in overhead, and because practical difficulties arise in implementation of the systems. Using a shared passive bus, for example, propagation rates and data transfer times introduce an absolute barrier as to the rate at which transactions can be processed.

DESCRIPTION OF THE INVENTION

This invention is designed to address the problem of transmitting control information in a multidimensional computer network. A multidimensional computer network consists of a plurality of homogeneous or heterogeneous processing units, called nodes. All that is required of a node is that it be able to receive data blocks from other nodes and send data blocks to other nodes. A node, for example, could be a personal computer comprising a display, disk, communication adapter and keyboard.

Interconnecting the nodes are links which connect the nodes in a regular or irregular pattern as shown in FIG. 1. A nodal link could be as simple as an asynchronous communication cable connecting two personal computers. Alternatively, a local area network could provide multiple communication links for each node as shown in FIG. 1. To manage nodal information exchange in a multidimensional computer network, it is necessary for nodes to exchange control information with every transmission of information.

The subject invention is applicable to links of any length and speed and to communication networks of any size. The network may interconnect tightly coupled processors in a parallel computer or heterogeneous processors distributed over a wide geographic area. The invention applies to multidimensional, or parallel networks as well as single dimensional networks where only one path exists between any two nodes.

The invention improves upon the prior art by stealing bandwidth from the data transmission facilities on demand without requiring prior reservation of a fixed amount of bandwidth. The bandwidth is used to transmit control information in small data transmissions.

SUMMARY OF THE INVENTION

The invention facilitates the transmission of control information in addition to message information between nodes on a multi-node system. More specifically, the aforesaid will be accomplished without reserving bandwidth and without impacting other messages sent via the network.

A multi-nodal, computer system employs a set of high speed nodal links to network messages between a plurality of nodes. Each node and its associated nodal link has communication transmital means for routing control information between nodes without impacting message transmission on the network.

Each nodal link is a full duplex communication link. Thus, whenever a message is transmitted in one direction and no corresponding incoming message is present, the full bandwidth of the link can be employed to transmit control information in the opposite direction without impacting communication system performance. The invention exploits this capability to transmit control information associated with information exchanged between nodes.

On occasion, transmission of data messages in both directions may be active when the control information should be sent. When this is the case, the data message is temporarily stored in a buffer while the control information is transmitted. If too many messages are incoming to a particular node, and the buffering means are insufficient to store all messages, then a control block is transmitted back to the node sending the data messages to temporarily block message transmission to the node.

DETAILED DESCRIPTION OF THE INVENTION

Figure 1:
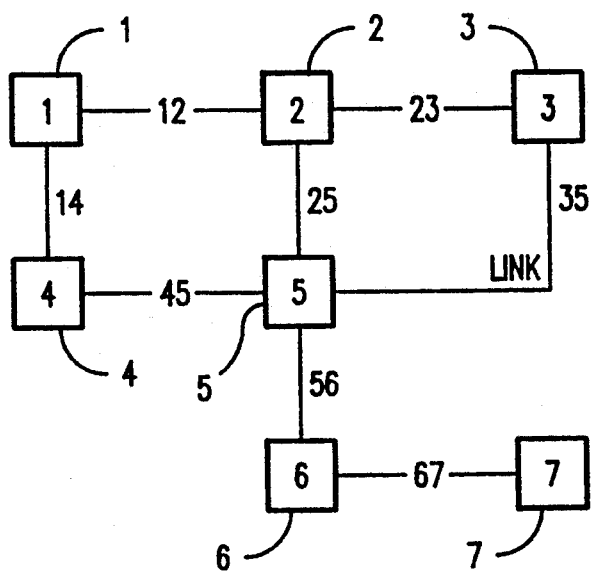
FIG. 1 is a block diagram of a multiple node system in accordance with the present invention.

The easiest way to design a network in which messages are mixed with control information is to reserve bandwidth for the transmission of control information. For example, if each link comprises eight wires for transmitting and receiving data in each direction, seven of those wires could be used to send massages and one of those wires could be reserved for control information. In such a scheme, there would always be one wire available for sending control information even if a message was being sent over than link.

The problem with this scheme is that in the absence of control information, only seven eighths of the bandwidth of the link would be available for sending messages. The eighth wire, which is reserved for control information, would remain idle and its bandwidth would be wasted when control information was not transferred.

Using time-multiplexing has the same problem. For example, a communication system employing every tenth byte sent over each link for control information is feasible. However, in such a system, only nine tenths of the available bandwidth would be utilized in the absence of control information. Likewise, if certain bytes of every message were reserved to facilitate transmission of control information, that bandwidth would be wasted in the absence of control information at the time that those bytes were sent.

If bandwidth cannot be reserved for control information, then the network must be designed to allow control information to temporarily interrupt the transfer of a message across that same link. One common way to implement this type of network is to split every message into fixed size blocks, called packets, which are sent in order through the network. When control information needs to be inserted, the link can complete the current packet, buffer the next packet to be sent and send out control information instead of the packet.

In its simplest implementation, the packet which is replaced by backwards control information can be buffered until the end of the message. However, this implementation requires that every intermediate node have at least enough memory for one packet. It also implies that the message may arrive out of order at the destination node which is a severe limitation.

To avoid sending data out of order, the displaced packet can be buffered and backwards control information can be sent to the source of the message to delay any more packets until the displaced packet(s) held in storage can be sent. However, this requires each intermediate node to have enough memory to hold every packet of the message starting with the first displaced packet until the source node stops sending data. It also requires additional special control information to be sent (to slow or stop the message) every time any normal control information is sent, creating an avalanche effect.

One solution to this problem is to send the displaced packet out the link as soon as the control information has been sent without waiting for a break in the message. As the displaced packet is sent, the packet which follows it would have to be buffered and as that packet is sent the one following it would have to be buffered and so on until the message ends.

For this method to function effectively, two buffers would be required. One buffer would store the displaced packet while the control information was being sent. Then as the contents of the first buffer is being sent, a second buffer would be necessary to hold the next packet. Once the first packet is sent and the transmission of the next packet is started, the first buffer is freed for use in buffering the third packet after the delay.

If more control information needed to be sent before the end of the message, one more buffer would be required to effectively delay the remainder of the message by two packets. As long as there was a limit on the number of times control information could interrupt the message, one could supply enough buffers to guarantee that the system would always be able to delay any message enough to send all required control information.

The problem is that the amount of control information over a link is unrelated to the message traveling in the same direction over that same link. Therefore, predefining the memory requirements for a particular job is not possible and this method is not commercially practical.

The subject invention is designed to enhance the function of multi-hop communication networks used to transfer data between processing points in a distributed data processing system. Consider the simple distributed data processing system and communication network shown in FIG. 1.

A distributed data processing system consists of a number of homogenous or heterogeneous data processing sites, called nodes. For example, in FIG. 1 boxes 1, 2, 3, 4, 5, 6 and 7 represent nodes. Each node can be as simple as a small storage device (disk or memory) or as complex as a complete multiprocessing computer system (personal computer). It is, however, assumed that each node is able to both receive data blocks from other nodes and send data blocks to other nodes.

A distributed data processing system also consists of a communication network used to send blocks of data between nodes. One common type of communication network consists of a number of point to point transmission systems, called links, which interconnect the nodes in a regular or irregular pattern. For example, in FIG. 1 lines 12, 14, 23, 25, 35, 45, 56 and 67 represent links.

This invention is applicable to links of any length, including links which connect two nodes in the same cabinet and links which connect two nodes in different cities. The type of transmission facility used is also not important as long as each link supports full-duplex transmission (data transfer in both directions at the same time).

For simplicity, assume that data sent between two nodes connected with a link is sent using that link. For example, in FIG. 1 data sent from node 1 to node 2 would be sent across link 12. When data is sent between two nodes which are not directly connected, multiple links will be used. For example, data sent from node 1 to node 6 might use links 12, 25 and 56. This invention is applicable regardless of the mechanism used to find a path through the network and the mechanism used to handle the data within source, destination or intermediate nodes (nodes 2 and 5 in the previous example) used during the transmission of a data block.

This invention can be used regardless of the or format of data sent across the links. In ar, there is no requirement that the data be split into separately routed packets (fixed size blocks of data) or that there be any restrictions on the size of data blocks sent. The term message will be used to refer to a data block being transferred between nodes.

Problem Solved By Invention

Referring to FIG. 1, consider the transmission of a message from node 1 to node 6. While the data is being sent from one node to another it may be necessary for the receiving node to send information back to the sending node in order to complete or control the data transmission. The following list gives some examples of the type of control information which may be sent.

1. When the message reaches the destination node (node 6 in the example), information may be sent back to the source node (node 1) to ask for a re-transmission of the message if it was not received correctly.

2. If a link being used during the message transfer fails, then control information may be sent back to abort the message transfer without waiting for the end of the message.

3. If the destination node or any of the intermediate nodes (nodes 2 and 5) are buffering the data as it is sent and those buffers fill up, information may be sent back to the sending node to temporarily pause the data transmission until the buffer overflow condition ends. At that point, another piece of control information may be sent backwards to restart the message.

4. If the choice of links which the message uses is determined dynamically at the beginning of the message transfer then control information may be sent back by links under consideration to indicate whether or not a given link is available to be used to transfer the message.

If a given link (for example, link 12) is actively sending a message in only one direction (node 1 to node 2), then given that links are required to be full duplex, control information can be sent backwards by using the idle transmission capability normally reserved for sending messages in the opposite direction (node to node 1).

This simple technique does not work, however, if a link is busy sending messages in both directions. In our previous example, if one message is being sent from node 1 to node 2 and another message is being sent, at the same time, from node 2 to node 1 then there is no obvious way to send control information related to either message backwards across link 12.

Requirements for Solution

This invention is designed to solve the problem of how to send control information backwards across one or more links in a communication network when those links may already be busy sending unrelated messages. Based on the characteristics of the system in which this invention will be used, this invention has to solve the previous stated problem while meeting the following requirements.

1. The need to send control information in the system should not place any restrictions on the length of messages which can be sent in the network. Thus a message can vary in length.

2. Control information should be sent as soon as possible after it is generated. In particular, the sending of the control information can not be delayed until the end of any other message which may be blocking the transmission of the control information. This is because messages can be any length (see requirement 1) making the wait for an end of message undefined and potentially very long.

3. When a message is sent over multiple hops, there should no requirement for any significant amount of memory (more than a few bytes) in any of the intermediate nodes. This is especially important since messages can be any length making the amount of memory needed to store the longest messages at an intermediate node very large. This requirement implies that the network does not use store-and-forward techniques where each intermediate node stores each message in local memory before forwarding it on to the next link towards the destination node.

4. If control information has to be sent over a link, no other links actively sending that message or the source node generating that message should have to be explicitly told to slow down in order to provide room for the control information.

This is because the control information which would have to be sent to slow down a message would itself require another message to slow down as it is sent backwards over a link. This could cause an avalanche effect eventually flooding the network with requests to slow down.

5. If control information is sent over a link which is busy sending a message, then the control information will steal bandwidth from the message. However, in the absence of control information, that message should use the full bandwidth of the link. Specifically, none of the available bandwidth of a link can be reserved for control information which may not be sent.

6. Although it can be assumed that there is a limit to the amount of control information sent backwards for any given message, because of requirement 1, there is no relationship between any given message being sent over a link and the control information sharing that link.

In other words, a given link may have one long message flowing from left to right and lots of short messages flowing from right to left. Because the control information associated with a short message flows backwards control information might have to be sent left to right over the link before the message which is flowing left to right ends.

7. If control information is sent over a link which is busy sending a message, then the message transfer may be interrupted locally but the data in that message must remain in order with no data lost and the message can not be prematurely terminated.

For simplicity, it will be assumed that every link in the network has the same bandwidth and the full bandwidth of every link is used when sending messages. This means that if a message is sent between two nodes which are not directly connected (for example, node 1 to node 6), the message will use the entire bandwidth of every intermediate link in the path (links 12, 25 and 56 in our example).

If this assumption were relaxed such that any of the intermediate links, except for the first link, had more bandwidth than the first link, then when a message was sent over that path, it would only use a subset of the bandwidth available over each of the faster intermediate links. The extra bandwidth in those intermediate links could then be used to send control information which would reduce the applicability of this invention to those slower links in the network which were completely used.

The situation gets a little more confusing if the first link has more bandwidth than any other link in a multi-link path. In that case, a message can either be sent out using only part of the bandwidth of the first link to avoid overloading the other links. Or, the full bandwidth of the first link could be used which would cause one of the intermediate nodes to receive more data than it could send. In the second case, the intermediate node would be required to buffer the extra data to prevent it from being lost. This, in turn, requires that intermediate node to have significant amounts of buffer memory in violation of requirement 3 (above).

Thus, as this invention applies to every link in the system which is running at its full bandwidth, it will be assumed that every link is running at the same speed equal to the full bandwidth of any link to simplify the description of this invention. In networks where link speed varies, this invention is also applicable, although only to those links which are used at full bandwidth.

Detailed Logic of Invention

This invention improves upon the prior art by providing a simple, yet effective, means for delaying a message so control information can be inserted as well as providing a mechanism which guarantees that a small amount of buffer memory is sufficient using a technique where idle links are BLOCKED as if they were busy to limit the amount of control information which could delay any given message.

Figure 2:
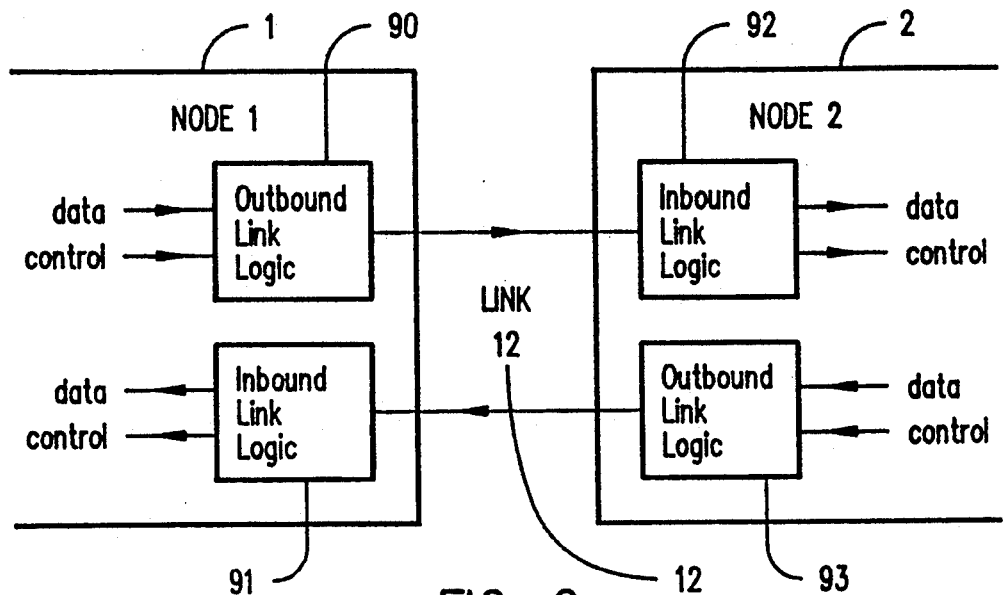
FIG. 2 is a block diagram of the nodal linking architecture in accordance with the present invention.

Consider a single full-duplex link 12 between two nodes 1 and 2 in a communication network as shown in FIG. 2. Messages sent forward from node 1 to node 2 will be generated within node 1 and given to logic block 90 to be sent over the link 12. Likewise, messages sent from node 2 to node 1 will, inside node 1, be extracted from link 12 by logic block 91 and given to node 1 for processing or forwarding through other links. Control information associated with any message flowing from node 1 to node 2 will be sent backwards from node 2 to node 1 by having the control information inserted into any message stream flowing from node 2 to node 1 by node 2's outbound link logic 93. The control information is then separated from that message stream by node 1's inbound link logic 91.

The logic within a node which sends, receives and routes messages between links as well as the logic which processes control information is beyond the scope of this invention. What is described by this invention is the processing of message and control information between the routing logic within the node and the link level drivers and receivers. This logic, which is shown as blocks 90 and 91 in FIG. 2 is detailed in FIG. 3.

Forward flowing messages are logically divided into packets, each of which is the same size as the smallest piece of control information. Thus, packets are typically between one to four bytes. The stream of packets from the node are put into a first-in-first-out buffer or FIFO 100. The output of the FIFO is fed into multiplexor 101 where either the message data, backwards control information, or special MSG-BLOCK or BLANK characters can be selected. The output of the multiplexor is then fed into the link driver 102 as depicted in FIG. 4.

In the absence of any backwards control information, message data is sent through the FIFO without buffering, fed through the multiplexor and sent over the link with a minimum of delay. The bandwidth of the link should be designed to match the speed of message data coming from the node.

Figure 4:
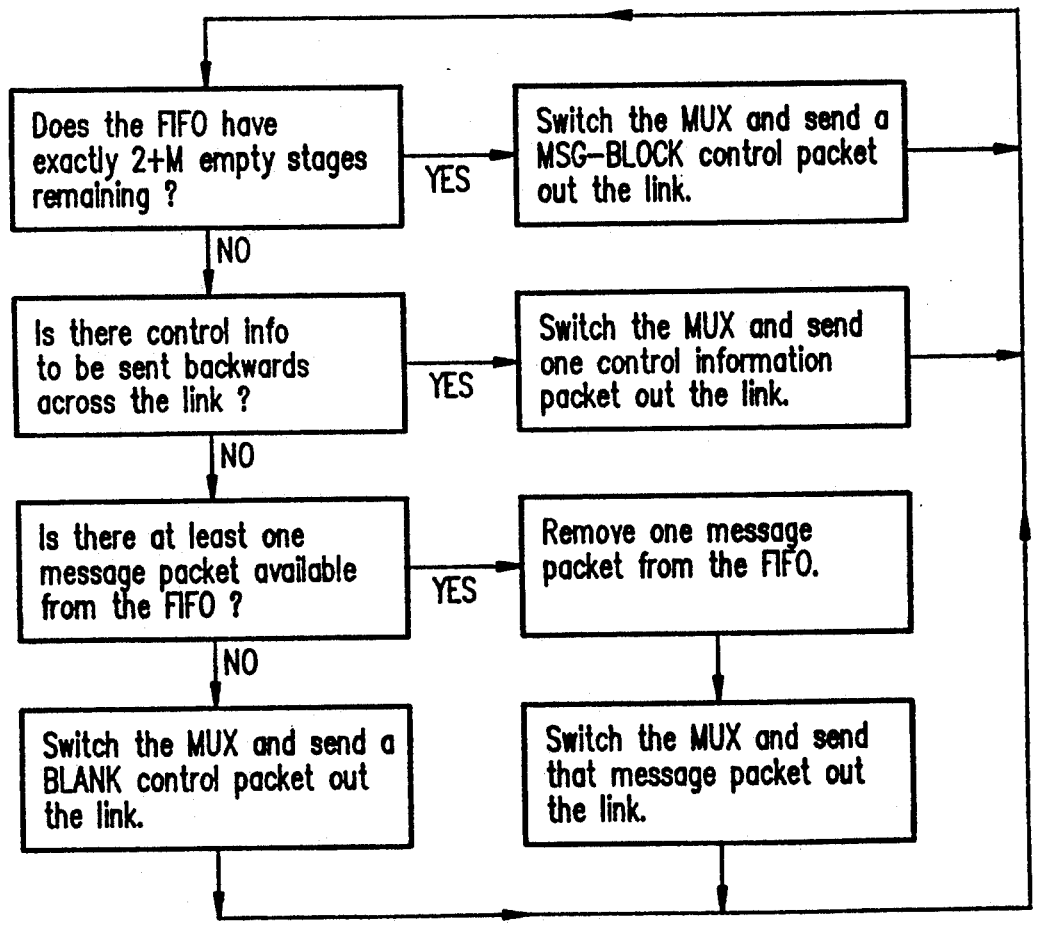
FIG. 4 is a flowchart of the outbound control logic in accordance with the present invention.

When backwards control information is presented to be sent over the link, the outbound control logic 103, fully detailed in the flowchart depicted in FIG. 4, is designed to switch the multiplexor 101 to allow the control information access to the link. During that time, the message is delayed by allowing one or more packets to back up in the FIFO. After the control information is sent, the multiplexor is restored and the message continues where it left off.

If there is neither message data or backward control characters to be sent over the link, then the outbound control logic will switch the multiplex to its own output and sends a special BLANK control packet over the link to indicate that there is a gap in the message.

Figure 3:
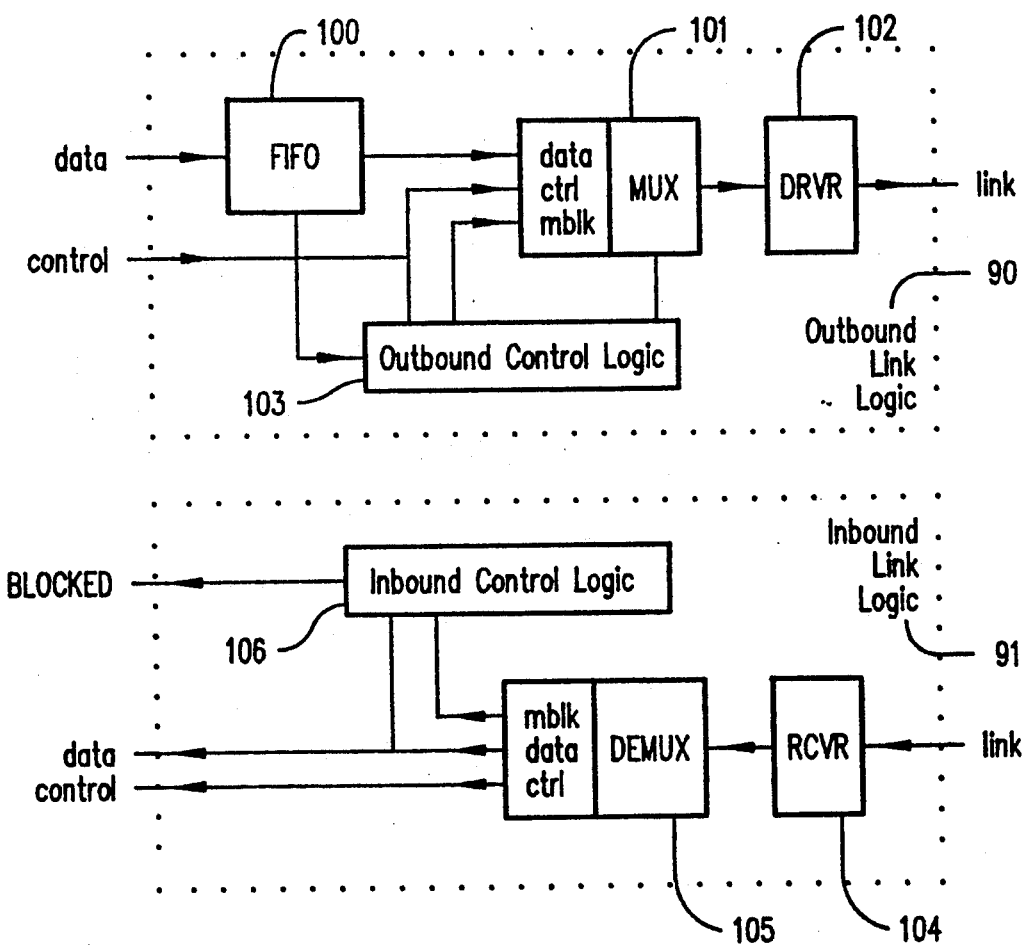
FIG. 3 is a block diagram of the inbound and outbound control logic in accordance with the present invention.

Every driver is connected to a receiver in another node. The receiver in this node which connects to the driver at the other end of the link is shown in FIG. 3 as 104. Data from the receiver is fed into a de-multiplexor 105 where message data is separated from control information.

Figure 5:
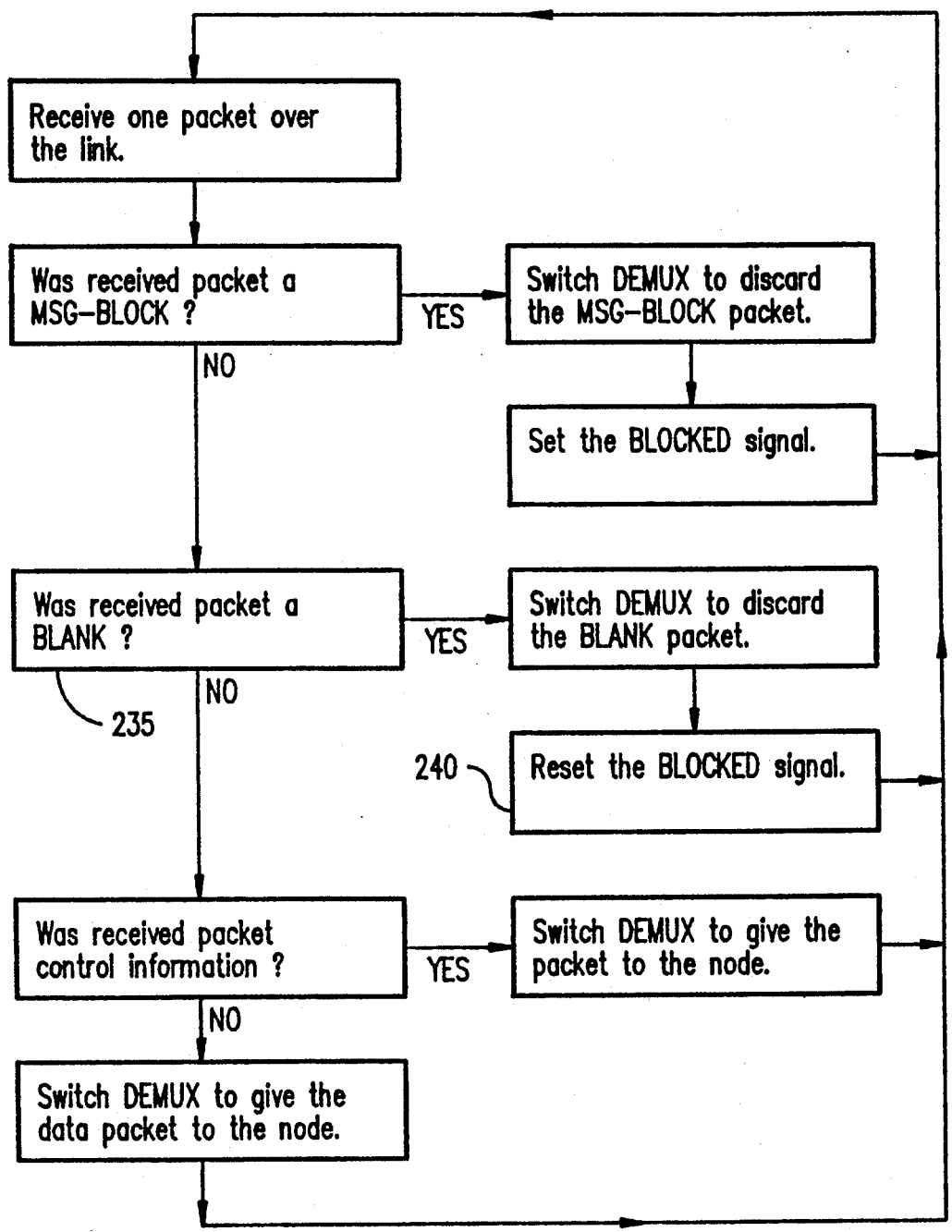
FIG. 5 is a block diagram of the inbound control logic in accordance with the present invention.

The inbound control logic 106, fully detailed in the flowchart depicted in FIG. 5, is designed to remove both BLANK and MSG-BLOCK packets from the inbound data stream. These two characters look like a backwards control character, except that they are generated by the outbound control logic rather than the node. All data and control character except for BLANK and MSG-BLOCK are sent to the node for further processing.

The method used to distinguish message data from control information depends on the type of link used and is beyond the scope of this invention. In some systems, an escape character is used to mark the beginning of control information. In other systems, the set of unique packets (characters) which can be sent over the link is larger than the set needed for message data. The packet types unused for message data can be used for control information.

The width of the FIFO is usually set to the packet size. When a message is delayed in order to insert control information, it is the FIFO which acts like memory to hold the packets. Thus, the depth of the FIFO determines how much control information can be sent without dropping packets.

The FIFO should be designed with a relatively short fall through time relative to a packet transmission time. The fall through time is defined as the time from when data enters the FIFO until it can be read from the FIFO. As long as the fall through time is relatively short, it can be assumed that when data is not available from the FIFO that the FIFO is mostly empty.

In order to prevent the FIFO from overflowing, the outbound control logic, 103 in FIG. 3, monitors the amount of room remaining in the FIFO as fully detailed in the flowchart depicted in FIG. 4. When the FIFO is almost full defined later) then the outbound control logic 103 will interrupt the message to send its own piece of control information, called a MSG-BLOCK.

The MSG-BLOCK will be sent over the link to the receiver at the other end of the node. This piece of control information will then be stripped from data stream by the inbound control logic 106 in the other node, as fully detailed in the flowchart depicted in FIG. 5. When a MSG-BLOCK is received, the inbound control logic in the receiving node sets a control line called BLOCKED which is monitored by the node. This BLOCKED signal does not effect any message currently being sent through the node; however, after the current message finished, no new messages can be accepted by that link until the BLOCKED signal is cleared.

After a MSG-BLOCK is detected by the inbound control logic 106, that control logic will start to look for a BLANK control packet as shown in function block 235 of FIG. 5. When a BLANK is detected, the inbound control logic can assume that the FIFO at the other end of the link is almost empty. At this point, the BLOCKED signal can be reset as shown in function block 240 of FIG. 5. This usually occurs at the end of the message, although a break in the middle of the message is possible if the message is being transmitted slower that the bandwidth of the link.

In order to fully comprehend how this invention functions, it is necessary to review what can be assumed about the number of backwards control packets which may be seen.

Referring to FIG. 1, assume a message A is being sent from node 1 to node 6 using links 12, 25 and 56. At the same time a message B is being sent from node 2 to node 4 using links 12 and 14. Notice that link 12 has two messages going across it, one in each direction.

Each message can cause some amount of backwards control information to be generated. Let M equal the maximum amount of control information generated in response to any given message. Notice that M is unrelated to the amount of control information which can interrupt any given message. In our example, if nine short messages (B1-B9) are sent from node 2 to node 4 at the same time that one long message A is sent from node 1 to node 6 then up to 9*M pieces of control information may have to be inserted into message A as it is sent over link 12 from node 1 to node 2.

Assume that the FIFO in node 1 has room for 3*M packets. If, during the transmission of message A, more than 3*M pieces of control information are sent across link 12, then some packets of message A will be lost. To avoid losing parts of message A, it is necessary to limit the amount of control information generated by limiting the number of messages (B1-B9) which flow in the opposite direction.

With reference to FIG. 2, message A is flowing from node 1 through block 90 across link 12 through block 92 and into node 2. Once the message has entered into node 2 it will be routed across link 25 which is not shown. Message B is flowing from node 2 through block 93 across link 12 through block 91 and into node 1 enroute to node 4.

Every message B which flows from node 2 to node 4 will generate control information flowing from node 4 to node 2. The control information will be sent into node 1 through block 90 across link 12 through block 92 and into node 2, stealing bandwidth from message A which is using the same link 12. Every time a piece of control information is sent across link 12, another packet of message A is delayed and the FIFO 100 in FIG. 3, inside block 90 fills a little more.

When the number of empty stages remaining in the FIFO 100 inside block 90 is equal to 2+M, the outbound control logic 103 inside block 90 will cause a MSG-BLOCK to be sent across link 12 to node 2. The MSG-BLOCK transmission delays message A some more and uses up one more empty stage of the FIFO.

The MSG-BLOCK character is removed from the link by the inbound control logic 106 inside block 92. That control logic then tells node 2 that link 12 is BLOCKED. Assume that a message B3 is being sent from node 2 to node 1 when the BLOCKED signal is set. The BLOCKED state does not effect message B3 because that message is already in progress. In addition, message B3 is still free to cause up to M more pieces of control information to be sent across link 12 because the FIFO has M+1 more empty stages.

After message B3 has ended, any new message B4 will not be allowed to start being sent across link 12 as long as link 12 is flagged as BLOCKED. In an adaptive routing system, the routing logic inside node 2 is free to select another path for the message if possible. Otherwise, messages from node 2 to node 4 will be delayed or rejected until the BLOCKED condition is cleared as if the link was busy with another message.

Meanwhile the inbound control logic 106 in block 92 is monitoring the message A data coming across link 12 from node 1. If a BLANK control packet is detected, it implies that the FIFO 100 inside block 90 is either empty or almost empty. When this event occurs, the inbound control logic resets the BLOCKED condition and message B traffic is again allowed to flow from node 2 to node 1.

Logic Analysis

This invention works by stealing bandwidth from message traffic in order to send control information. The net result is that each message from which bandwidth is taken is stretched out so that it takes longer to send. This invention only works as long as there is an idle period between messages into which the stretched messages can be extended.

Because there is no explicit flow control information required by this invention, the source node for each message remains unaffected by the insertion of control information. The destination node, however, sees messages which have been interrupted by control information arriving at a slower rate than they were sent. In a system where every message is acknowledged (by sending control information back to the source node) before another message is sent, this will have a net effect of delaying the acknowledgement to the source node. On the other hand, the delay in the acknowledgement is proportional to the amount that the message was delayed and acts as a convenient flow control mechanism to ensure enough idle time between messages.

Because the size of every FIFO is much smaller than the message size, some links will occasionally get BLOCKED. The percent of links which are BLOCKED at any given time is related to the type and amount of message traffic as well as the size of each FIFO. Thus the size of each FIFO should be designed to trade off the loss of network bandwidth due to link BLOCKED conditions for real estate available on each node for FIFO memory.

The minimum size for a FIFO is 3+M packets (where M is the maximum number of backwards control characters which can be generated in response to any given message). In practice, FIFO sizes on the order of 3+3*M have been shown to give good performance (less than 1% links BLOCKED during peak message traffic).

An important characteristic of this invention is that long messages sent over multiple hops do not tend to cause congestion over their entire route. This tends to limit the number of BLOCKED links any given message can cause no matter how many links that message is sent over.

To understand this, consider a message A being sent from node 1 to node 6 over links 12, 25 and 56. If backwards control information is sent over link 12 from node 1 to node 2, message A will be delayed in the FIFO inside node 1. In addition, the stream of message A packets flowing through node 2 will have a gap due to the removed control information. This gap allows any downstream FIFOs (in node 2 or node 5) to drain a little. Thus, the insertion of control information early in the message actually relieves any backup later in the message reducing the possibility that other links will have to be BLOCKED.

Application of Invention

This invention is used in the routing system of a multi-dimensional nodal system to optimize the transmission of control information in addition to messages between nodes. Nodes are connected using pairs of serial links (one in each direction). The links vary in length from one to twenty feet. Each link supports two-hundred and sixty-eight unique characters (encoded in ten bits) of which two hundred and fifty-six are used for message data and the remaining twelve are used for control information. Thus the packet size and the corresponding width of every FIFO is set to one character (10 bits).

Nodes are interconnected in a four dimensional torus network with an additional link at every node for I/O. Every node has nine links, each of which contains a FIFO and outbound and inbound control logic as depicted in FIG. 3. The FIFO size has been set to sixteen packets because every message can generate up to four backwards control packets.

Inside the node, data is routed between links using the "Adaptive Routing in a Parallel Computer System" invention disclosed in copending application Ser. No. 07/386,521, incorporated herein by reference. The adaptive routing system handles the BLOCKED condition as if the link were busy with another message and, in general, has no problem routing around any BLOCKED links. When reading the routing invention disclosure, the LINK-CLOSE and ACKNOWLEDGE commands correspond to backwards control information described in this invention disclosure.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. Apparatus for network messaging between a plurality of nodes and for providing idle message periods between successive messages, a message comprising a plurality of message packets, said apparatus including transmitting means for transmitting message packets and control information packets between nodes over message transmission lines, said apparatus comprising:
   buffer means for storing control information packets and message packets from a message; and
   switch means responsive to a control information packet in said buffer means, for inserting said control information packet between message packets of said message, said inserting of said control information packet causing a time required for transmission of all message packets of said message to increase so that at least a packet of said message is transmitted during an idle time following said message.

2. Apparatus as recited in claim 1 wherein said transmitting means transmits control information packets and message packets synchronously.

3. Apparatus as recited in claim 1, further comprising networking means for connecting one node to another node.

4. Apparatus as recited in claim 1 wherein said transmitting means transmits variable length control information and messages.

5. Apparatus as recited in claim 1, wherein control information includes information requesting a re-transmission of a message.

6. Apparatus as recited in claim 1, wherein control information includes information requesting a transmission abort.

7. Apparatus as recited in claim 1, wherein control information includes information requesting a temporary pause of further transmission of 8. Apparatus as recited in claim 1, wherein control information includes information requesting a restart of transmission of information packets.

9. Apparatus as recited in claim 1, wherein control information includes status information on transmission between nodes.

10. Apparatus for communication of messages between a plurality of nodes, said apparatus providing idle message periods between messages, the nodes comprising processor means, memory means for storing portions of the message data, multiplexor means and communication means for transmitting selected control information and messages between nodes, a message comprising a series of message data portions, comprising:
   (a) communication means for receiving and transmitting a message comprising message data portions;
   (b) memory means for storing said message data portions;
   (c) processor means for selecting control information from the set of control information in the memory means to transmit, based on current communication status; and
   (d) multiplexor means for transferring selected control information or message data portions to the communication means for transmission to a subsequent node, said multiplexor means transferring said control information and delaying transfer of a message data portion and, thereafter, transferring said message data portion that was delayed, to thereby expand transmission time of a message that includes said message data portion that was delayed, into an idle message period following said message.

11. Apparatus as recited in claim 10, wherein said communication means enables full-duplex communication.

12. Apparatus as recited in claim 10, further comprising means for transmitting control information and message data portions in packet form.

13. Apparatus as recited in claim 10, wherein said communication means receives and sends control information and message data portions synchronously.

14. Apparatus as recited in claim 10, further comprising networking means for connecting one node to another node.

15. Apparatus as recited in claim 10, further comprising means for transmitting variable length control information and messages.

16. Apparatus as recited in claim 10, wherein the control information includes information requesting a re-transmission of the information.

17. Apparatus as recited in claim 10, wherein the control information includes information requesting a transmission abort.

18. Apparatus as recited in claim 10, wherein the control information includes information requesting a temporary pause of further transmission of information.

19. Apparatus as recited in claim 10, wherein the control information includes information requesting a restart of transmission of information.

20. Apparatus as recited in claim 10, wherein the control information includes status information on transmission between nodes.

21. Apparatus as recited in claim 10, wherein transmission speed remains constant during transmission of the control information.

22. Apparatus as recited in claim 10, further comprising variable rate transmission means at some of the plurality of nodes.

23. A method for network messaging between a plurality of nodes wherein idle message periods are provided between successive messages, comprising the steps of:
   transmitting a message between nodes in the form of successive message packets that together comprise a message;
   determining when a control information packet is ready for transmission; and
   delaying transmission of a message packet and inserting said control information packet therefor and subsequently transmitting said message packet that was delayed to thereby expand transmission time of said message into a said idle period that follows said message.

24. A method as recited in claim 23 wherein said receiving and sending of control information and message packets is accomplished synchronously.

25. A method as recited in claim 23, wherein the control information includes information requesting a re-transmission of information.

26. A method as recited in claim 23, wherein the control information includes information requesting a transmission abort.

27. A method as recited in claim 23, wherein the control information includes information requesting a temporary pause of further transmission of information.

28. A method as recited in claim 23, wherein the control information includes information requesting a restart of transmission of information.

29. A method as recited in claim 23, wherein the control information includes status information on transmission between nodes.

30. A method for communication of messages between a plurality of nodes, the nodes comprising processor means, memory means for storing portions of messages and control information, multiplexor means and communication means for transmitting selected control information and message portions between nodes, said communication means providing idle message periods between messages, comprising the steps of:
   (a) receiving a message;
   (b) storing portions of the message;
   (c) selecting control information from the memory means to transmit based on current communication status; and
   (d) transferring selected control information or message portions via multiplexor means to the communication means for transmission to a subsequent node, said control information interspersed with said message portions and transferred with said message portions by delaying transfer of selected message portions and transmitting control information instead, to thereby expand the transmission time of a message comprising said message portions into an adjoining idle message period.

* * * * *

UNITED STATES PATENT AND TRADEMARK OFFICE
CERTIFICATE OF CORRECTION

PATENT NO. : 5,293,377
DATED : March 8, 1994
INVENTOR(S) : Gould

It is certified that error appears in the above-identified patent and that said Letters Patent is hereby corrected as shown below:

In col. 14, claim 7, line 18, after the word "of" (second occurrence), should appear --information packets.--

Signed and Sealed this

Twenty-eighth Day of June, 1994

Attest:

BRUCE LEHMAN

Attesting Officer   Commissioner of Patents and Trademarks